Patented Oct. 18, 1932

1,882,811

UNITED STATES PATENT OFFICE

ERNEST F. GRETHER AND JOSEPH L. KEENER, JR., OF MIDLAND, MICHIGAN, ASSIGNORS TO THE DOW CHEMICAL COMPANY, OF MIDLAND, MICHIGAN, A CORPORATION OF MICHIGAN

PREPARATION OF ORTHO-CHLOR-PARA-NITRANILINE

No Drawing.    Application filed February 25, 1929.   Serial No. 342,663.

The method heretofore employed for preparing ortho-chlor-para-nitraniline is that of Beilstein and Kurbatow (Ann. 182; 108), whereby nitro-ortho-dichlor-benzene is heated under pressure with alcoholic ammonia at a temperature from 180° to 210° C. So far as we are aware, all later investigators have followed this same method. The yields obtainable thereby leave much to be desired, and the reaction time found necessary, e. g. about 48 hours, is excessive. The object of the present invention is to provide an improved method of procedure adapted to fulfill the requirements for the successful commercial production of the afore-mentioned compound.

To the accomplishment of the foregoing and related ends the invention, then, consists of the steps hereinafter fully described and particularly pointed out in the claims, the following description setting forth in detail certain procedure whereby the principle of the invention may be used.

We have found that the present reaction may be carried out with highly satisfactory results if aqueous ammonia solution is substituted for alcoholic ammonia. In fact, such substitution greatly shortens the time of reaction and, furthermore, enables the reaction to be carried out at materially lower temperatures than before. For example, substantially complete conversion to the desired ortho-chlor-para-nitraniline is brought about by heating nitro-ortho-dichlor-benzene with aqueous ammonia solution for about 7 hours at 160° C. When the reaction is carried out at temperatures below about 180° C. the mono-amino derivative alone is produced, the amino-group entering the para-position relative to the nitro-group. At 180° C. and above there is a tendency to the formation of some of the diamino-compound, so that a mixture of the two derivatives is obtained instead of a substantially pure mono-amino-compound. The reaction proceeds satisfactorily at temperatures between 140° and 180° C., the preferred operating temperature being from 150° to 170° C.

The intermediate material, nitro-ortho-dichlor-benzene, employed in the present method is most advantageously obtained by nitrating ortho-dichlor-benzene dissolved in concentrated sulphuric acid, with cooling to prevent the temperature from rising above 50° C. The latter compound, which is a by-product of the manufacture of mono-chlor-benzene and para-dichlor-benzene, is a cheap and readily available material that heretofore has found but very limited industrial application. Nitration thereof yields principally 1, 2 dichlor-4 nitrobenzene, which is precipitated from the reaction mixture by diluting with water and is recrystallized from alcohol.

*Example.*—50 grams 1, 2 dichlor-4 nitrobenzene were heated under pressure with agitation with 300 cubic centimeters aqueous ammonia solution (27 per cent $NH_3$) for 7 hours at 160° C. The product was ortho-chlor-para-nitraniline, which separated from the reaction mixture and was recovered in highly pure form simply by filtering the crystals from the aqueous liquid. M. P. 104° C. Yield 96 per cent.

This compound is a valuable intermediate for the preparation of azo dyestuffs and other organic derivatives.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of making ortho-chlor-para-nitraniline which comprises heating 1, 2 dichlor-4 nitrobenzene under super-atmospheric pressure with aqueous ammonia solution at a temperature between about 140° and about 180° C. whereby the chloro group in position 1 is selectively replaced by an amino group, the remaining chloro group being substantially unreacted upon.

2. The method of making ortho-chlor-para-nitraniline which comprises heating 1.2-dichlor-4-nitrobenzene under super-atmospheric pressure with aqueous ammonia solution at a temperature between about 140° and about 180° C. while agitating the reaction mixture, whereby the chloro group in position 1 is selectively replaced by an amino group, the remaining chloro group being substantially unreacted upon.

3. The method of making ortho-chlor-para-nitraniline which comprises heating 1.2-dichlor-4-nitrobenzene under super-atmospheric pressure with concentrated ammonium hydroxide at a temperature between about 150° and about 170° C. while agitating the reaction mixture, whereby the chloro group in position 1 is selectively replaced by an amino group, the remaining chloro group being substantially unreacted upon.

Signed by us this 21st day of February, 1929.

ERNEST F. GRETHER.
JOSEPH L. KEENER, Jr.